(12) United States Patent
Ojima et al.

(10) Patent No.: US 6,334,716 B1
(45) Date of Patent: Jan. 1, 2002

(54) OPTICAL TRANSMIT/RECEIVE MODULE AND METHOD OF FABRICATING THE SAME

(75) Inventors: Jun Ojima; Takashi Shiotani; Sadayuki Miyata, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/412,975

(22) Filed: Oct. 6, 1999

(30) Foreign Application Priority Data

Dec. 11, 1998 (JP) .................................................. 10-353237

(51) Int. Cl.$^7$ .............................. G02B 6/36; H04B 10/00
(52) U.S. Cl. ................................ 385/89; 385/88; 385/92; 359/152
(58) Field of Search .......................... 385/88–93; 359/152

(56) References Cited

U.S. PATENT DOCUMENTS

| | | | |
|---|---|---|---|
| 4,373,814 A | * | 2/1983 | Lacombat et al. ............ 356/350 |
| 5,125,053 A | * | 6/1992 | Abe et al. ........................ 385/36 |
| 5,127,075 A | * | 6/1992 | Althaus et al. .................. 385/94 |
| 5,838,859 A | * | 11/1998 | Butrie et al. .................... 385/92 |
| 5,841,562 A | * | 11/1998 | Rangwala et al. ............ 359/152 |
| 5,867,622 A | * | 2/1999 | Miyasaka et al. ............... 385/88 |
| 6,040,934 A | * | 3/2000 | Ogusu et al. .................. 359/152 |

* cited by examiner

*Primary Examiner*—John D. Lee
*Assistant Examiner*—Jerry T Rahll
(74) *Attorney, Agent, or Firm*—Staas & Halsey LLP

(57) ABSTRACT

An optical module receives light traveling through an optical fiber in two ways. A coupler is provided in a case member and is attached to an end surface of a ferule having the optical fiber. The coupler allows light of a first wavelength to pass therethrough along a first optical axis of the optical fiber and reflects light of a second wavelength so that reflected light travels along a second optical axis perpendicular to the first optical axis. A light emitting element is provided so as to be located on one of the first and second optical axes. A light receiving element is provided so as to be located on the other one of the first and second optical axes.

15 Claims, 7 Drawing Sheets

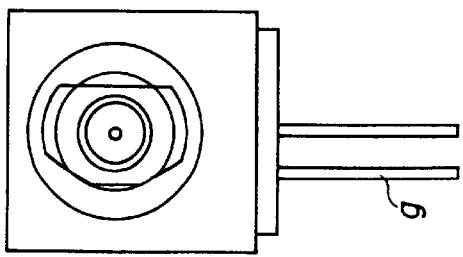
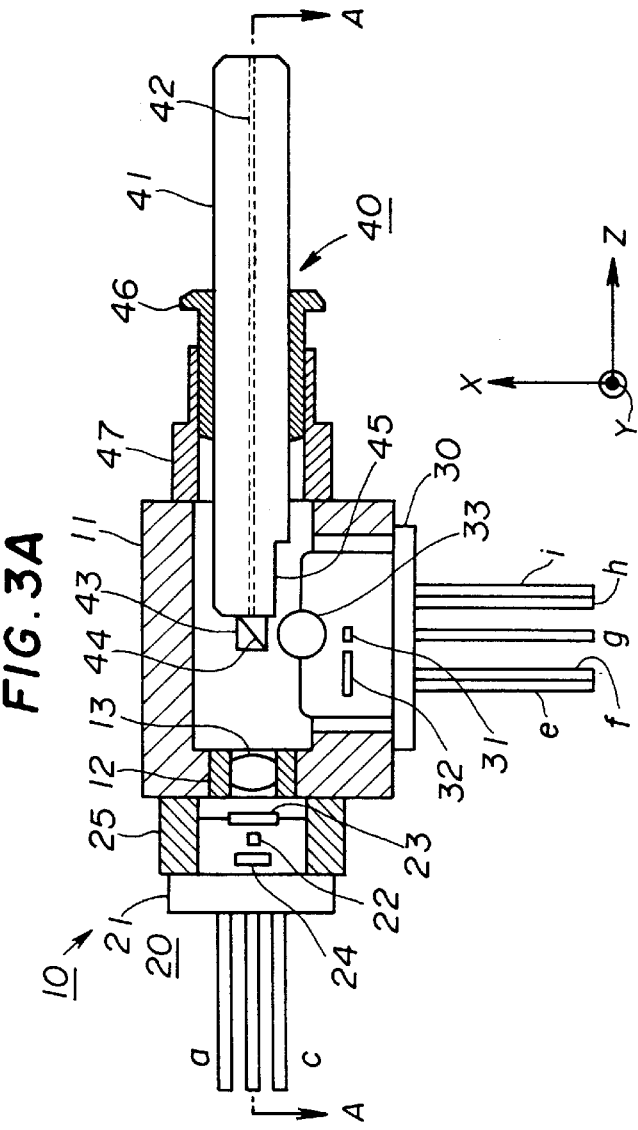
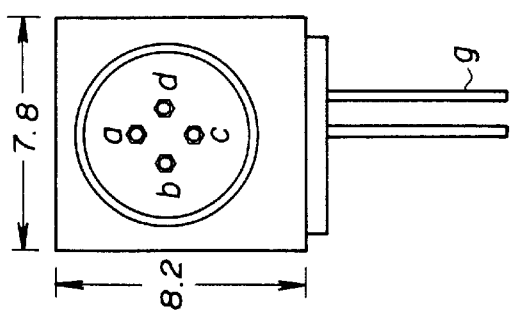
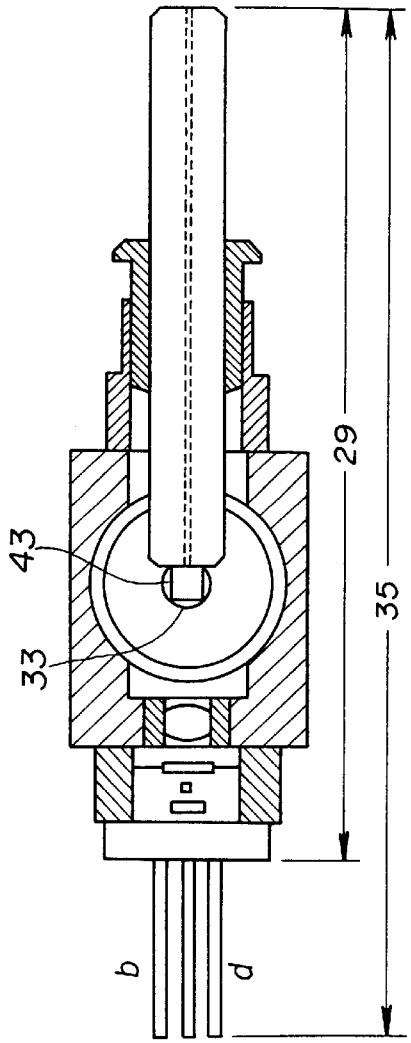

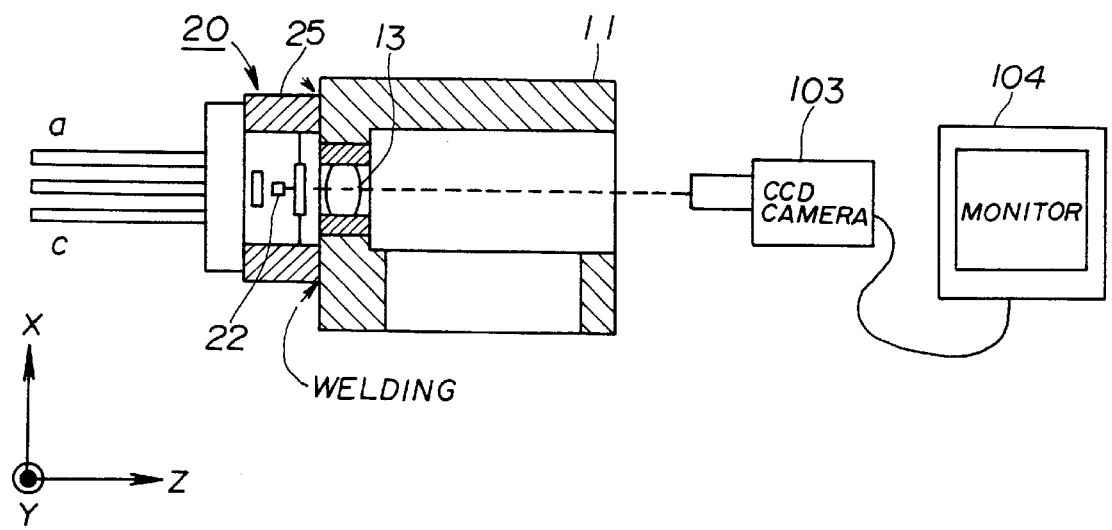
FIG.5A
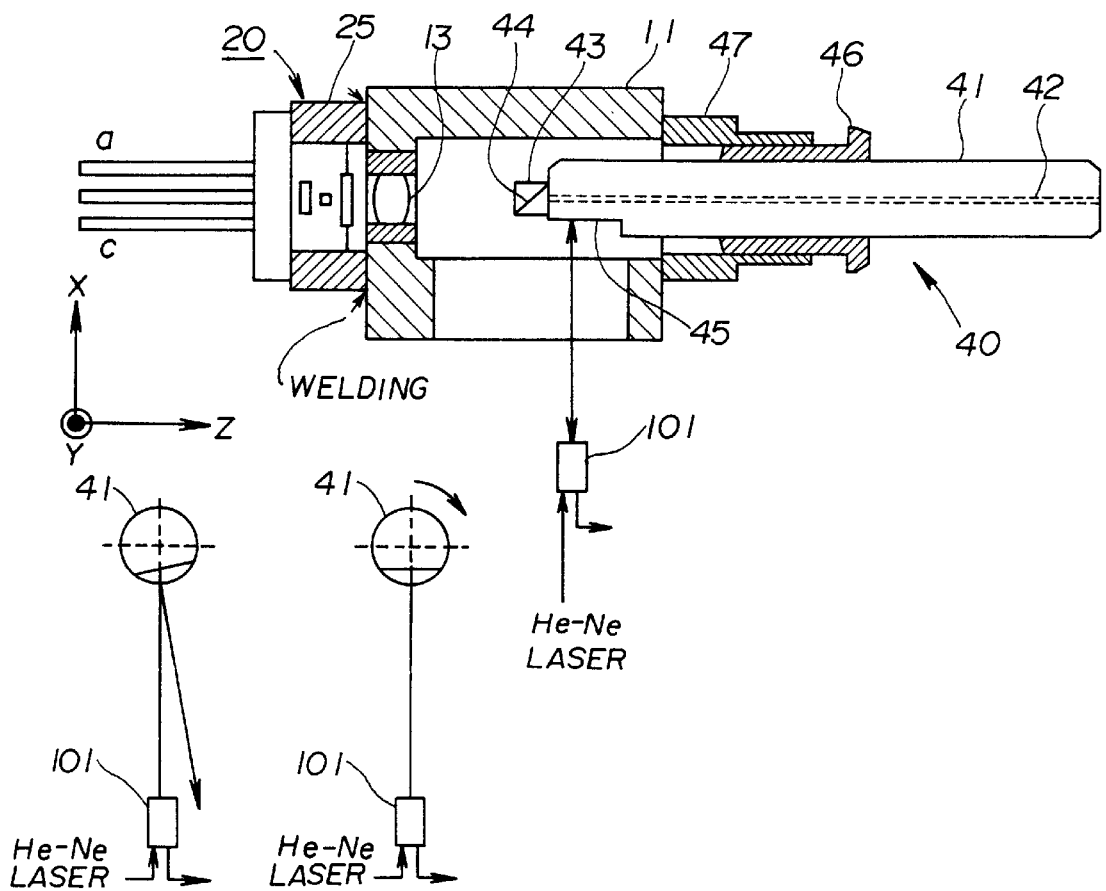
FIG.5B
FIG.5C  FIG.5D

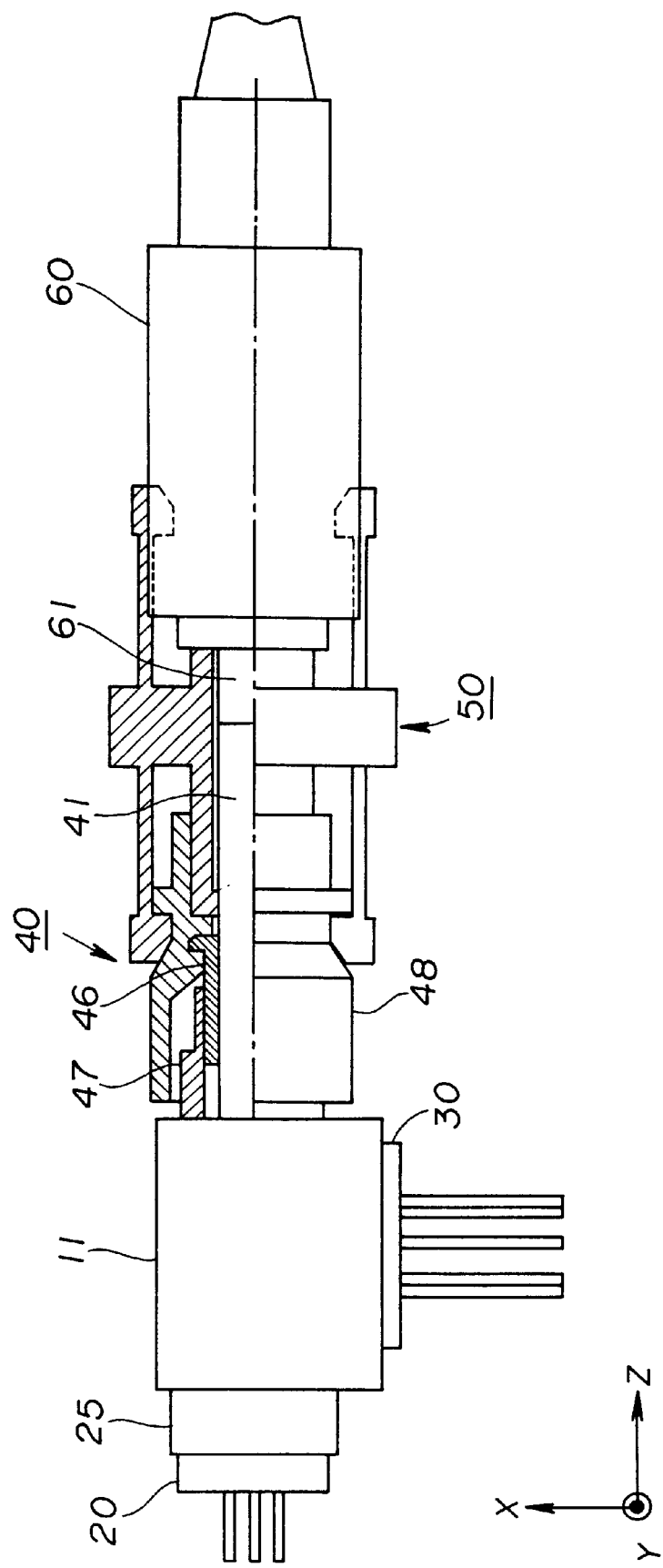

OPTICAL TRANSMIT/RECEIVE MODULE AND METHOD OF FABRICATING THE SAME

BACKGROUND OF THE INVENTION

1. Field of the Invention

The present invention generally relates to optical transmit/receive modules and method of fabricating the same, and more particularly to an optical transmit/receive module which transmits and receives lights propagated through an optical fiber in two ways and a method of fabricating the same.

Nowadays, high-speed digital transmission services such as transmission services using an ISDN (Integrated Services Digital Network) and a CATV (CAble TeleVision) are available. It is expected that a demand of multimedia will explosively be raised at the beginning of the 21st century. Thus, the work of providing optical access networks (main networks) is in progress. In the future, an optical fiber will be extended up to an optical network unit (which functions as an optical subscriber line termination device) provided in a mast or the inside of a small-scale building, condominium or the like. Thus, optical signals are transmitted through the optical fiber in two ways so that high-speed broadband services can be presented. In order to realize such services, it is required to reduce the size and cost of the optical subscriber line termination device, which is implemented as an optical transmit/receive module.

2. Description of the Related Art

FIG. 1 illustrates a conventional optical subscriber line termination device (optical transmit/receive module) 70. The device 70 includes an optical module 71, an optical adapter 72, a fiber-fused-type WDM (Wavelength Division Multiplexing) filter 73, optical connectors 74 and 75, an optical cable 76, and optical fibers 77–79. The device includes a board on which optical components and electronic components are mounted. The optical module 71 has a laser diode LD for optical transmission and a photodiode PD for optical reception. The optical adapter 72 is used to detachably connect the optical fibers 77–79 for internal connections. The WDM filter 73 is of a fiber fusing type. The optical cable 76 connects the device to an optical transmission path.

A transmitted light having a wavelength $\lambda_1$ (=1.3 $\mu$m) from the laser diode LD is applied to the WDM filter 73 via the optical adapter 72 and the optical fiber 78, and is also combined with the optical path of the optical fiber 77. Then, the combined light is transmitted to the optical cable 76 via the optical connector 75. A received light having a wavelength $\lambda_2$ (=1.55 $\mu$m) from the optical cable 76 is applied to the WDM filter 73 via the optical fiber 77, and is distributed to the optical path of the optical fiber 79. Then, the distributed light is applied to the photodiode PD via the optical adapter 72.

However, the WDM filter 73 is large in size and is expensive. In addition, the optical adapter 72 and the optical connector 74 are needed to optically connect the WDM filter 73 of the fiber fusing type and the optical module 71. Hence, the conventional optical subscriber line termination device needs an increased number of components. Further, it is necessary to ensure a mounting radius of curvature greater than a threshold level in order to reduce loss caused in the optical fibers 77–79. Hence, the device needs a large mounting space and it takes a long time to mount the optical fibers 77–79.

SUMMARY OF THE INVENTION

It is a general object of the present invention to provide an optical transmit/receive module in which the above disadvantages are eliminated.

A more specific object of the present invention is to provide a compact, simple, highly reliable optical transmit/receive module.

The above objects of the present invention are achieved by an optical module receiving light traveling through an optical fiber in two ways configured as follows. A coupler is provided in a case member and is attached to an end surface of a ferrule having the optical fiber. The coupler allows light of a first wavelength to pass therethrough along a first optical axis of the optical fiber and reflects light of a second wavelength so that reflected light travels along a second optical axis perpendicular to the first optical axis. A light emitting element is provided so as to be located on one of the first and second optical axes. A light receiving element is provided so as to be located on the other one of the first and second optical axes.

Another object of the present invention is to provide a ferrule assembly which makes it possible to provide a compact, simple, highly reliable optical transmit/receive module.

This object of the present invention is achieved by a ferrule assembly comprising: a ferrule in which an optical fiber is provided; and a coupler attached to an end surface of the ferrule, the coupler allowing light of a first wavelength to pass therethrough along a first optical axis of the optical fiber and reflecting light of a second wavelength so that reflected light travels along a second optical axis perpendicular to the first opUcal axis.

A further object of the present invention is to provide a method of fabricating a compact, simple, highly reliable optical transmit/receive module.

This object of the present invention is achieved by a method of fabricating an optical module comprising the steps of: assembling a case member, a coupler attached to an end surface of a ferrule having the optical fiber, a light emitting element and a light receiving element into the optical module, the coupler allowing light of a first wavelength to pass therethrough along a first optical axis of the optical fiber and reflecting light of a second wavelength so that reflected light travels along a second optical axis perpendicular to the first optical axis, the ferrule having a step portion formed on a part of an outer circumference portion of the ferrule, the step portion being perpendicular to the second optical axis; projecting a laser beam onto the step portion in a direction perpendicular to the first optical axis; and adjusting an angle of rotation of the ferrule by referring to the laser beam reflected by the step portion.

BRIEF DESCRIPTION OF THE DRAWINGS

Other objects, features and advantages of the present invention will become more apparent from the following detailed description when read in conjunction with the accompanying drawings, in which:

FIGS. 3A, 3B, 3C and 3D respectively illustrate an optical transmit/receive module according to an embodiment of the present invention;

FIGS. 5A, 5B, 5C and 5D illustrate a step of a method of fabricating the module shown in FIGS. 3A through 3D;

FIG. 7 is a diagram of an optical light transmit/receive module according to another embodiment of the present invention.

DESCRIPTION OF THE PREFERRED EMBODIMENTS

Figure 1:
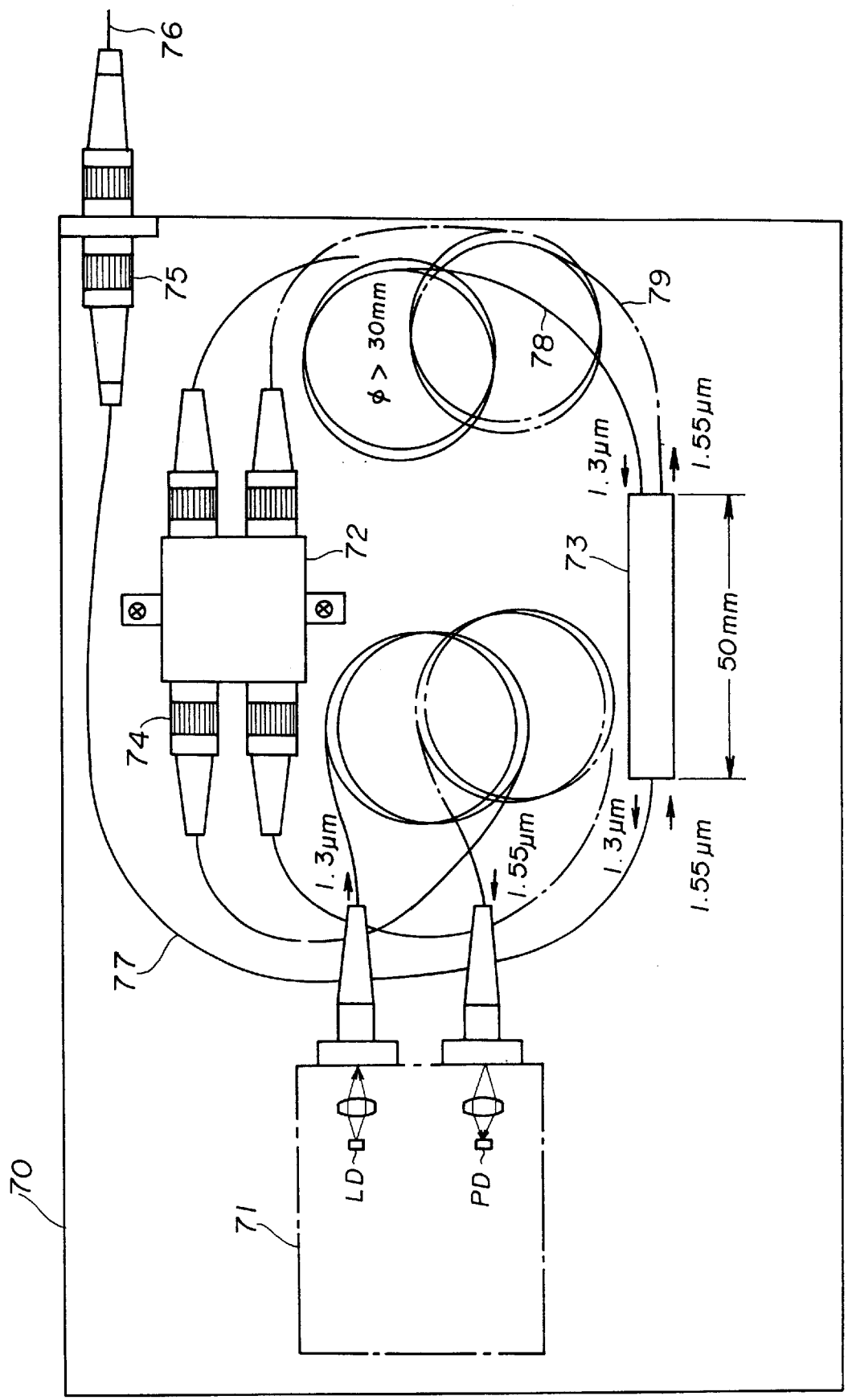
FIG. 1 is a diagram of a conventional optical transmit receive module.
Figure 2:
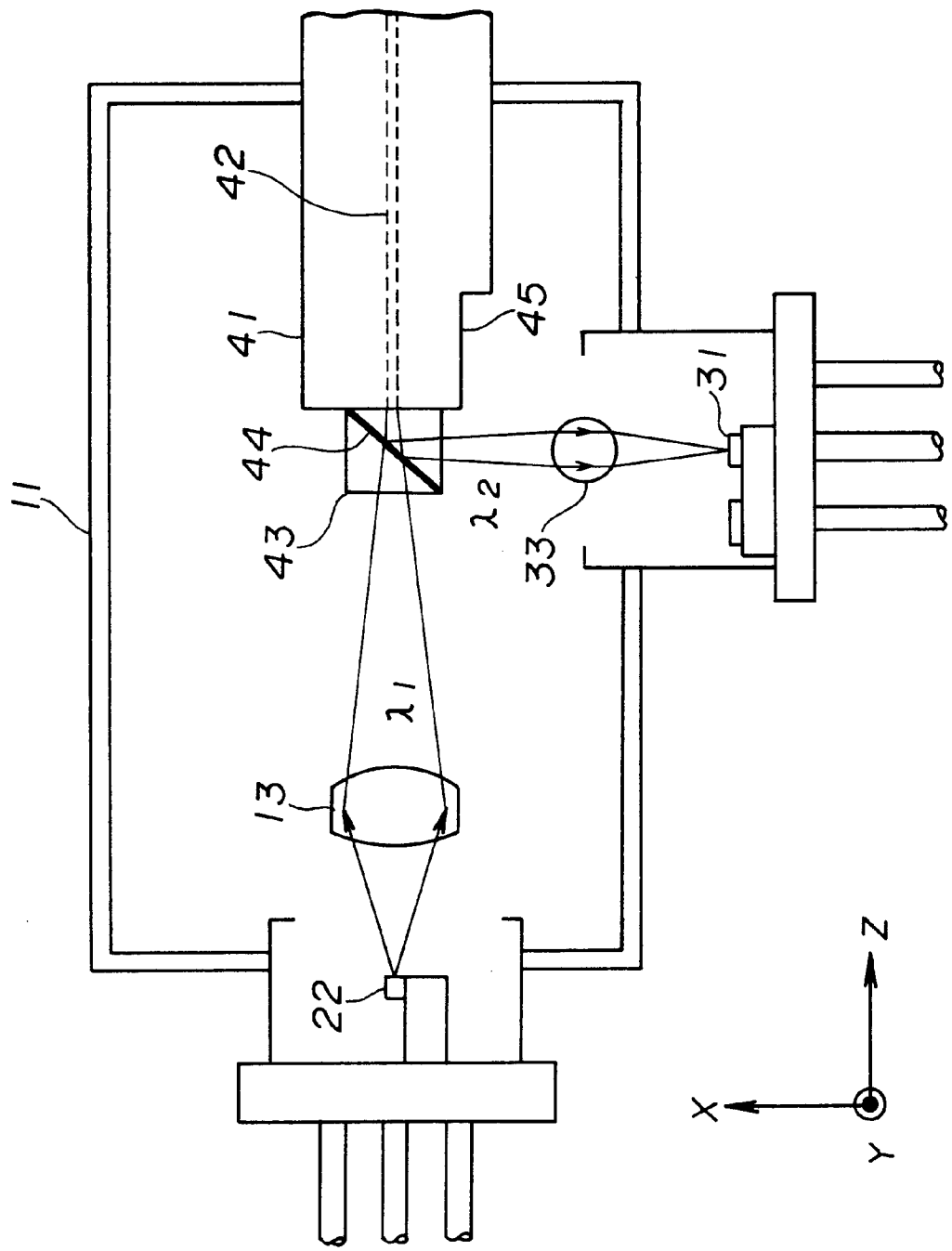
FIG. 2 is a diagram illustrating the principle of the present invention.

FIG. 2 illustrates the principle of the present invention.

An optical transmit/receive module shown in FIG. 2 transmits an optical signal to an optical fiber and receives an optical signal therefrom. A WDM coupler 43 of a prism type is fixed to an end of a ferrule 41 having a built-in optical fiber 42 and is located on the optical axis of the ferrule 41 A. The WDM coupler 43 has a wavelength-selective coupling and splitting film 44 for combining and separating a light having a particular wavelength. The WDM coupler 43 passes a light of a first wavelength $\lambda_1$ towards the optical axis of the ferrule 41, and reflects a light of a second wavelength $\lambda_1$ in the direction (another or second optical axis) orthogonal to the optical axis. An optical transmit element 22 such as a laser diode element is arranged on the optical axis, and an optical receive element 31 such as a photodiode element is arranged on the optical path (the second optical axis) orthogonal to the optical axis. The laser diode element 22 may be provided instead of the photodiode element 31. In this case, the photodiode element 31 is substituted for the laser diode element 22. The above-mentioned components are supported by a case member 11.

The transmitted light $\lambda_1$ (equal to, for example, 1.3 μm) from the laser diode element 22 passes through the WDM coupler 43 along the optical direction and travels straightforward to the optical fiber 42. The received light $\lambda_2$ (=1.55 μm) from the optical fiber 42 is reflected by the WDM coupler 43 and travels straightforward to the photodiode element 31.

Since the components are supported by the case member 11 as shown in FIG. 2, the optical transmit/receive module has a simple structure, and fine optical couplings can be obtained by a small number of components. The module thus configured is compact, less-expensive and highly reliable.

Preferably, a single lens 13 is provided between the laser diode element 22 and the WDM coupler 43, and is located on the optical axis. Similarly, a single lens 33 is provided between the photodiode element 31 and the WDM coupler 43, and is located on the optical path or axis orthogonal to the optical axis of the ferule 41.

The WDM coupler 43 of the prism type is fixed to the end of the ferrule 41 (that is, an optical fiber) and is located on the optical axis. Thus, it is possible to keep the optical length between the end surface of the optical fiber 42 and the laser diode element 22 and the optical length between the end surface of the optical fiber 42 and the photodiode element 31 at respective constant values at the time of assembling the components. Thus, it is possible to efficiently collect the beams emitted from the laser diode element 22 onto the optical fiber 42 by means of the single lens 13. Similarly, it is possible to efficiently collect the beams emitted from the optical fiber 42 onto the photodiode element 31 by the single lens 33. Hence, it is possible to emit the collimator lens which is used in the conventional module for collimating the light emitted from the spot light source.

Preferably, a step portion 45 is formed on a part of an outer circumference portion of the ferrule 41 and is located close to the end of the ferrule 41. The step portion 45 may be formed by cutting out the corresponding portion of the ferrule 41. The step portion 45 has a surface portion orthogonal to the direction vertical to the optical axis. The step portion 45 is used at the time of fabricating (or adjusting) the present module. More particularly, a light emitted from a test apparatus (not shown) is applied to the step portion 45 in the direction perpendicular to the optical axis. The above incident light is reflected by the step portion 45 and travels toward the photodiode element 31. Thus, it is possible to precisely adjust rotation about the Z axis of the ferrule 41 (that is, the WDM coupler 43).

Preferably, the optical connection part of the optical transmit/receive module has a receptacle structure. Thus, it is possible to easily make the optical connection with an external optical fiber cable or the like with high reliability.

FIGS. 3A through 3D illustrate an optical transmit/receive module 10 according to an embodiment of the present invention. More particularly, FIG. 3A is a vertical cross-sectional view of the optical transmit/receive module, FIG. 3B is a back view thereof, FIG. 3C is a front view thereof, and FIG. 3D is a transverse cross-sectional view taken along a line A—A shown in FIG. 3A. Some numerals shown in FIGS. 3A through 3D denote dimensions (mm).

The optical transmit/receive module 10 is made up of an LD (laser diode) assembly 20, a PD (photodetector) package 30, and a ferrule assembly 40. The assembly 20, the PD package 30 and the ferrule assembly 40 are fixed to and supported by a single casing member 11. The LD assembly 20 is an optical transmit part. The PD package 30 is an optical receive part. The ferrule assembly 40 forms an optical connection part. The single casing member 11 is formed of stainless steel or the like. A mount 12 is provided to an opening part of an optical transmit/receive end portion of the casing member 11 and is used to support a lens 13 for collecting the transmit light beam.

The LD assembly 20 has a structure in which the LD package 21 is fitted into and welded to a hollow cylindrical holder 25 made of stainless steel or the like. The LD package 21 has a metallic case in which a laser diode element 22 and a photodiode 24 are accommodated. The laser diode element 22 emits an optical transmit signal. The photodiode 24 monitors an optical output of the laser diode element 22 obtained at the back side of the laser diode element 22. A nitrogen gas is hermetically provided in the metallic case of the LD package 21. A window 23 made of sapphire or the like is provided in the metallic case and is located on the optical axis. Terminals a–d for an electric signal and a power supply (including ground) are provided to the back surface of the LD package 21.

The PD package 30 has a structure which accommodates the photodiode element 31 and a preamplifier 32. The photodiode element 31 is used to receive an optical signal. The preamplifier 32 preamplifies the output signal of the photodiode element 31. A lens 33 is mounted on the top (front) surface of the PD package 30 and is located on the optical axis. The lens 33 collects the received light onto the photodiode element 31. Terminals e–i for an electric signal and a power supply (including ground) are provided to the back surface of the PD package 30.

The ferrule assembly 40 includes the ferrule 41, the optical fiber 42, the WDM coupler 43, a holder 46, and a sleeve 47. The ferrule 41 is formed of a ceramic material. The optical fiber 42 is provided in the ferrule 41, and the two end surfaces of the optical fiber 42 are flush with the two end surfaces of the ferrule 41. The WDM coupler 43 of a prism type is directly fixed to one of the two ends of the ferrule 41 and is located on the optical axis. The holder 46 is a hollow cylindrical member made of a stainless steel or the like, and holds the ferrule 41. The sleeve 47 is formed of a stainless steel or the like. The holder 46 is attached to the ferrule 41 with pressure so that the ferrule 41 is inserted into the holder 46. Thus, the WDM coupler 43 attached to one end of the ferrule 41 is placed in position. As described before, the WDM coupler 43 is equipped with the wavelength-selective coupling and splitting film 44, which performs coupling and splitting operations on a light having a particular wavelength. Hereinafter, the wavelength-selective coupling and splitting film 44 will also be referred to as an SWPF film or a slant surface. The step portion 45 is formed on an outer circumference portion of the ferrule 41 and is located close to the end of the ferrule 41. The step portion 45 has a mirror surface.

The transmitted light having the wavelength $\lambda_1$ (equal to, for example, 1.3 μm) from the laser diode element 22 passes through the WDM coupler 43 along the optical direction and travels straightforward to the optical fiber 42. The received light having the wavelength $\lambda_2$ (=1.55 μm) from the optical fiber 42 is reflected by the WDM coupler 43 and travels straightforward to the photodiode element 31.

Figure 4A:
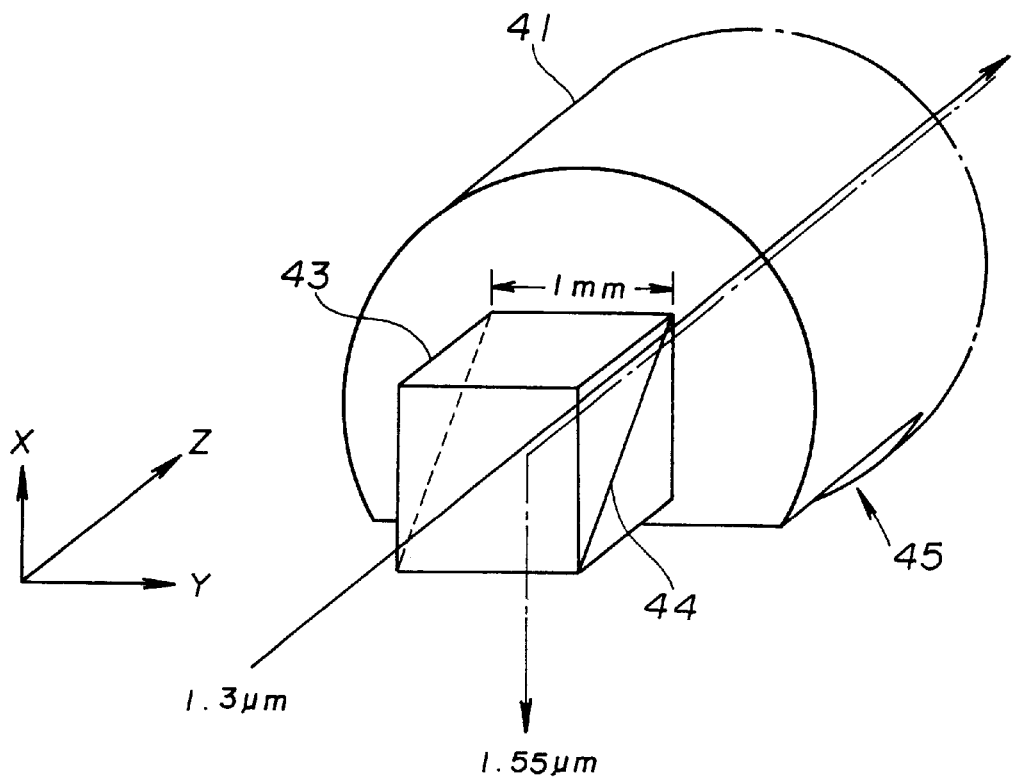
FIGS. 4A and 4B illustrate a WDM coupler used in the module shown in FIGS. 3A through 3D.
Figure 4B:
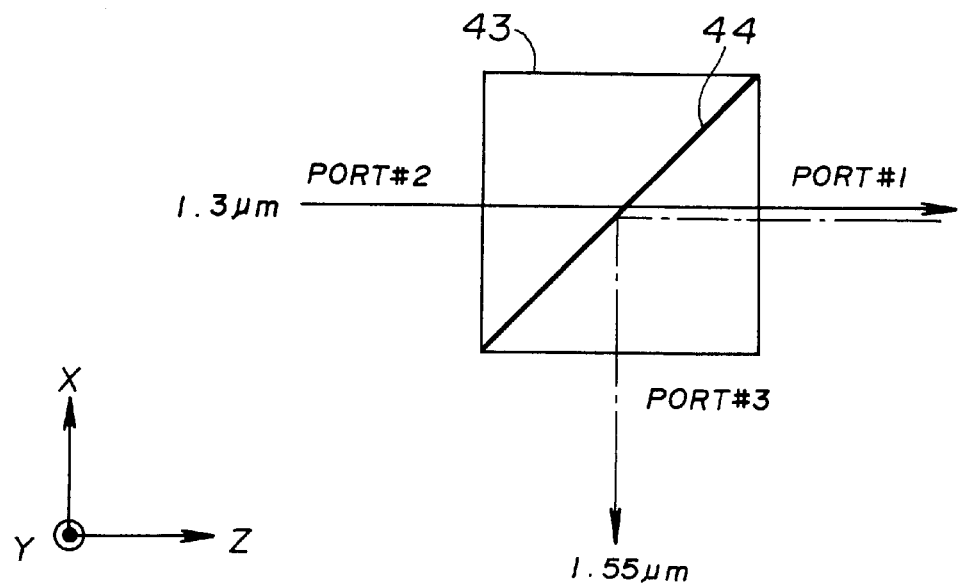

FIGS. 4A and 4B illustrate the WDM coupler 43. More particularly, FIG. 4A is a perspective view of the WDM coupler 43, and FIG. 4B is a side view thereof. Referring to FIG. 4A, the WDM coupler 43 fixed to the end surface of the ferrule 41 of a prism type having a shape of a 1 mm$^3$ cubic. The wavelength-selective coupling and splitting film 44 is provided on a diagonal surface of the WDM coupler 43 which is inclined to the optical axis at 45 degrees. The step portion 45 having the mirror surface extends in the direction orthogonal to the direction vertical to the optical axis of the optical fiber 42 and is thus parallel to the upper and lower surfaces of the WDM coupler 43.

Referring to FIG. 4B, the WDM coupler has ports #1, #2 and #3 for inputting and outputting lights. The light of the wavelength $\lambda_1$ (equal to 1.3 μm) incident to port #2 goes straight and reaches port #1. The light of the wavelength $\lambda_2$ (=1.55 μm) from port 1 is reflected by the film 44 and goes in the direction perpendicular to the optical axis. Then, the reflected light reaches port #3. The WDM coupler 43 is not limited to the specifically described type shown in FIGS. 4A and 4B and may be formed of anther type such as an optical waveguide type.

FIGS. 5A and 5B show an assembly process (fabrication method) of the optical transmit/receive module according to the present embodiment. More particularly, FIG. 5A illustrates a mechanism of attachment of the LD assembly 20.

Referring to FIG. 5A, the LD assembly 20 (that is, the holder 25) is loaded (positioned) onto the case member 11 by a conventional machine capable of precisely moving a member along the X, Y and Z axes. The position of the laser diode element 22 and the central position of the lens 13 are recognized through an image formed by a video signal obtained by a CCD camera 103 and displayed on a monitor 104. The camera 103 is positioned at the side of the case member 11 opposite the side thereof on which the lens 13 is provided. The operator adjusts the position of the holder 25 in the X and Y axes so that the optical axes of the laser diode element 22 and the lens 13 are aligned while viewing the image displayed on the monitor 104. When the optical axes of the laser diode element 22 and the lens 13 are aligned, the outgoing angle of the laser diode element 22 with respect to the lens 13 is set at 0 degree. After the above XY-axes adjustment, the laser diode assembly 20 (that is, the holder 25) is fixed to the case member 11 by welding such as laser welding.

FIGS. 5B, 5C and 5D illustrate an adjustment the angle of rotation of the ferrule assembly 40. The angle of rotation of the ferrule assembly 40 about the X axis can easily be performed by the step portion 45 formed in the ferrule 41. A He-Ne laser apparatus 101 capable of generating a spot-shaped beam is provided in the direction perpendicular to the optical axis of the optical fiber 42. The beam emitted via a beam emitting end of the He-Ne laser apparatus 101 is projected onto the step portion 45 having the mirror surface. The light reflected by the step portion 45 is received through a pin hole provided to the beam emitting end of the He-Ne laser apparatus 101. The angle of rotation of the ferrule 41 about the X axis can be adjusted so that the reflected light can duly be received via the pin hole.

FIGS. 5C and 5D are respectively front views of the ferrule 41 and illustrate an adjustment of the angle of rotation of the ferrule 41. If the ferrule 41 rotates about the Z axis, the beam emitted from the He-Ne laser apparatus 101 will not be returned to the pin hole thereof, as shown in FIG. 5C. In this case, there is a need for a fine adjustment of the angle of rotation of the ferrule 41. In the case shown in FIG. 5C, the ferrule 41 is gradually rotated in the clockwise direction until the reflected beam is duly received via the pin hole.

Figure 6A:
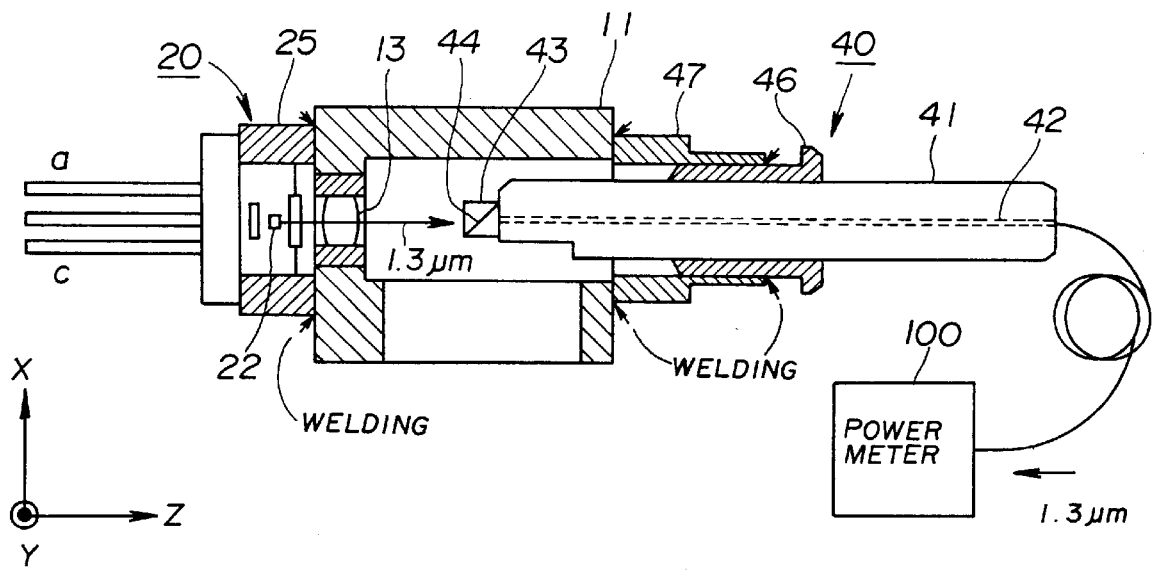
FIGS. 6A and 6B illustrate another step of the method of fabricating the module shown in FIGS. 3A through 3D.

FIG. 6A illustrates positioning of the ferrule 41 in the directions of the X, Y and Z axes. A power meter 100 is attached, through a fiber cable, to the optical fiber 42 connected to the rear end of the ferrule 41 of the ferrule assembly 40 which has been subjected to the adjustment described with reference to FIGS. 5A through 5D. The laser diode element 22 is driven to emit light of the wavelength $\lambda_1$ (equal to 1.3 μm). The power meter 100 monitors the received level of the light from the laser diode element 22. In this state, the position of the ferrule assembly 40 is adjusted in the directions of the X, Y and Z axes to that the maximum received power can be obtained. After the above adjustment, the holder 46 and the sleeve 47 are fixed together by welding such as laser welding. Then, the position of the ferrule assembly 40 is adjusted in the directions of the X and Y axes so that the maximum received power can be obtained. After the above adjustment, the case member 11 and the sleeve 47 are fixed together by welding such as laser welding.

Figure 6B:
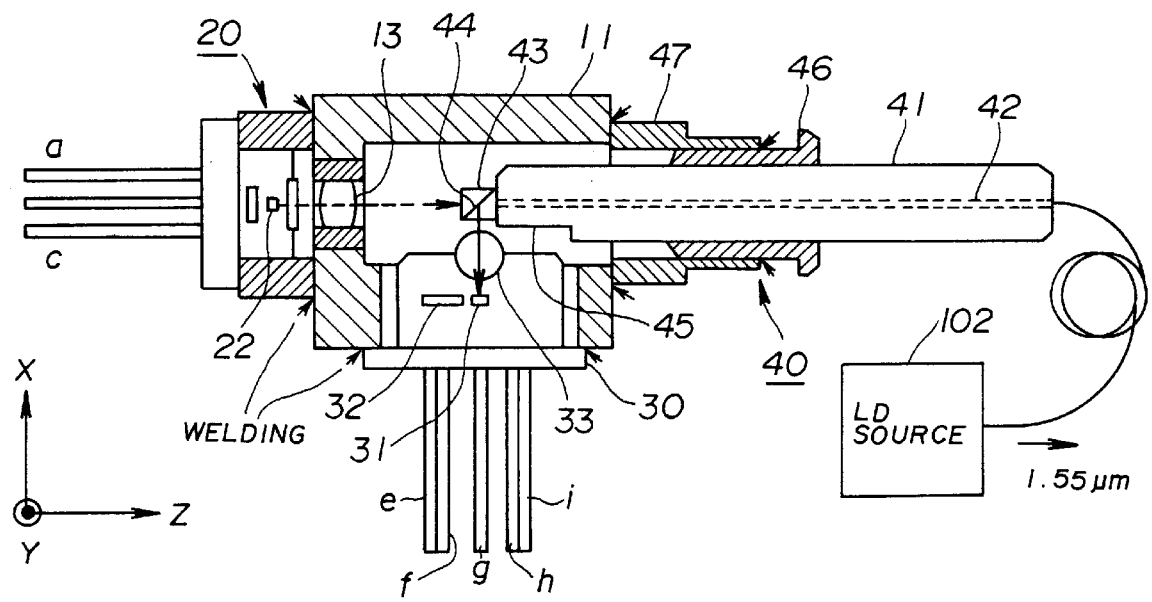

FIG. 6B illustrates an attachment of the PD package 30. The PD package 30 is loaded onto the case member 11. Light of the wavelength $\lambda_2$ (equal to 1.55 μm) emitted from an LD source 102 is applied to the optical fiber 42. The light reflected by the film 44 of the WDM coupler 43 is received by the photodiode element 31. The position of the PD package 30 is adjusted in the directions of the Y and Z axes so that the maximum received level of the photodiode element 31 can be obtained. After the above adjustment, the PD package 30 is welded to the case member 11 by laser welding or the like. Thus, the assembling process of the optical transmit/receive module 10 is completed.

FIG. 7 illustrates an optical transmit/receive module according to another embodiment of the present invention. The optical connection part of the optical transmit/receive module has a receptacle type or structure. More particularly, a frame 48 is provided around the ferrule assembly 40. A hook member 50 is fitted into a flange portion of the frame 48. An optical connector 60 of the receptacle type is fitted into the hook member 50. Hence, within the hook member 50, the ferrule 41 of the module 10 and the ferrule 61 of the optical connector 60 come into contact with each other, so that an optical connection between the respective optical fibers can be made. It is possible to employ another type of the receptacle structure.

The present invention is not limited to the specifically disclosed embodiments, and variations and modifications may be made without departing from the scope of the invention.

What is claimed is:

1. An optical module receiving light traveling through an optical fiber in two ways, said optical module comprising:
    a case member;
    a coupler provided in the case member and attached to an end surface of a ferrule having the optical fiber, the coupler allowing a signal light of a first wavelength to pass therethrough along a first optical axis of the optical fiber and reflecting a signal light of a second wavelength so that reflected light travels along a second optical axis perpendicular to the first optical axis;
    a light emitting element located on one of the first and second optical axes; and
    a light receiving element located on the other one of the first and second optical axes, said second wavelength being different than said first wavelength.

2. The optical module as claimed in claim 1, further comprising a first lens provided between the coupler and one of the light emitting element and the light receiving element and located on one of the first and second optical axes, and a second lens provided between the coupler and the other one of the light emitting element and the light receiving element and located on the other one of the first and second optical axes.

3. The optical module as claimed in claim 2, wherein the first lens is attached to the case member.

4. The optical module as claimed in claim 2, wherein the second lens is attached to a package in which the light receiving element is provided.

5. An optical module receiving light traveling through an optical fiber in two ways, said optical module comprising:
    a case member;
    a coupler provided in the case member and attached to an end surface of a ferrule having the optical fiber, the coupler allowing light of a first wavelength to pass therethrough along a first optical axis of the optical fiber and reflecting light of a second wavelength so that reflected light travels along a second optical axis perpendicular to the first optical axis;
    a light emitting element located on one of the first and second optical axes; and
    a light receiving element located on the other one of the first and second optical axes, wherein the ferrule comprises a step portion formed on a part of an outer circumference portion of the ferrule, the step portion being perpendicular to the second optical axis.

6. The optical module as claimed in claim 5, wherein the step part comprises a mirror surface.

7. The optical module as claimed in claim 1, further comprising an optical connection part of a receptacle type which couples the ferrule to the optical module.

8. The optical module as claimed in claim 1, wherein the light emitting element is provided in a holder attached to the case member.

9. The optical module as claimed in claim 1, wherein the light receiving element is provided in a package attached to the case member.

10. The optical module as claimed in claim 1, wherein the coupler is of a prism type.

11. A ferrule assembly comprising:
    a ferrule in which an optical fiber is provided; and
    a coupler attached to an end surface of the ferrule, the coupler allowing signal light of a first wavelength to pass therethrough along a first optical axis of the optical fiber and reflecting signal light of a second wavelength so that reflected light travels along a second optical axis perpendicular to the first optical axis, said second wavelength being different than said first wavelength.

12. The ferrule assembly as claimed in claim 11, wherein the coupler is of a prism type.

13. The ferrule assembly as claimed in claim 11, wherein the coupler has a cubic shape.

14. A ferrule assembly comprising:
    a ferrule in which an optical fiber is provided; and
    a coupler attached to an end surface of the ferrule, the coupler allowing light of a first wavelength to pass therethrough along a first optical axis of the optical fiber and reflecting light of a second wavelength so that reflected light travels along a second optical axis perpendicular to the first optical axis, wherein the ferrule has a step portion formed on a part of an outer circumference portion of the ferrule, the step portion being perpendicular to the second optical axis.

15. A method of fabricating an optical module comprising:
    assembling a case member, a coupler attached to an end surface of a ferrule having the optical fiber, a light emitting element and a light receiving element into the optical module, the coupler allowing light of a first wavelength to pass therethrough along a first optical axis of the optical fiber and reflecting light of a second wavelength so that reflected light travels along a second optical axis perpendicular to the first optical axis, the ferrule having a step portion formed on a part of an outer circumference portion of the ferrule, the step portion being perpendicular to the second optical axis;
    projecting a laser beam onto the step portion in a direction perpendicular to the first optical axis; and
    adjusting an angle of rotation of the ferrule by referring to the laser beam reflected by the step portion.

* * * * *